(12) United States Patent
Anderson et al.

(10) Patent No.: US 11,587,088 B2
(45) Date of Patent: Feb. 21, 2023

(54) METHOD AND SYSTEM FOR HOSTED ORDER PAGE/SILENT ORDER POST

(71) Applicant: Visa International Service Association, San Francisco, CA (US)

(72) Inventors: Lisa Anderson, San Francisco, CA (US); Sonny Truong, Pflugerville, TX (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 711 days.

(21) Appl. No.: 16/601,420

(22) Filed: Oct. 14, 2019

(65) Prior Publication Data

US 2020/0043009 A1    Feb. 6, 2020

Related U.S. Application Data

(63) Continuation of application No. 15/465,463, filed on Mar. 21, 2017, now Pat. No. 10,482,465, which is a continuation of application No. 13/549,187, filed on Jul. 13, 2012, now Pat. No. 9,639,828.

(60) Provisional application No. 61/508,563, filed on Jul. 15, 2011.

(51) Int. Cl.
| | |
|---|---|
| G06Q 20/40 | (2012.01) |
| G06Q 20/08 | (2012.01) |
| G06Q 30/06 | (2012.01) |
| G06Q 20/12 | (2012.01) |
| G06Q 20/02 | (2012.01) |
| G06Q 30/00 | (2012.01) |
| G06Q 30/018 | (2023.01) |

(52) U.S. Cl.
CPC ....... *G06Q 20/4016* (2013.01); *G06Q 20/027* (2013.01); *G06Q 20/085* (2013.01); *G06Q 20/0855* (2013.01); *G06Q 20/12* (2013.01); *G06Q 30/0185* (2013.01); *G06Q 30/06* (2013.01)

(58) Field of Classification Search
None
See application file for complete search history.

(56) References Cited

U.S. PATENT DOCUMENTS

| | | | |
|---|---|---|---|
| 5,715,314 A * | 2/1998 | Payne | G06Q 20/401 705/26.35 |
| 5,903,721 A | 5/1999 | Sixtus | |
| 7,319,978 B2 | 1/2008 | Minamishin et al. | |

(Continued)

OTHER PUBLICATIONS

Paypal Website Payments Standard Checkout Integration Guide, Nov. 2005 (Year: 2005).*

(Continued)

*Primary Examiner* — Neha Patel
*Assistant Examiner* — Nicholas K Phan
(74) *Attorney, Agent, or Firm* — Kilpatrick Townsend & Stockton LLP

(57) ABSTRACT

Generally, embodiments of the invention are directed to methods, computer readable medium, servers and systems for enabling merchants to use hosted order pages (HOPs) and/or silent order posts (SOPs) and thereby avoid handling payment information and the costs associated Payment Card Industry (PCI) compliance, while at the same time utilize third-party fraud detection screens and thereby avoid costs associated with fraudulent transactions.

20 Claims, 12 Drawing Sheets

(56) References Cited

U.S. PATENT DOCUMENTS

| | | |
|---|---|---|
| 7,657,482 B1 * | 2/2010 | Shirey ............... G06Q 20/4016 |
| | | 705/40 |
| 7,953,642 B2 | 5/2011 | Dierks |
| 8,121,942 B2 | 2/2012 | Carlson et al. |
| 2004/0030644 A1 * | 2/2004 | Shaper .................. G06Q 40/08 |
| | | 705/39 |
| 2007/0038560 A1 * | 2/2007 | Ansley ............... G06Q 30/0215 |
| | | 705/39 |
| 2007/0233573 A1 | 10/2007 | Wang et al. |
| 2007/0288377 A1 | 12/2007 | Shaked |
| 2008/0099552 A1 | 5/2008 | Grillion |
| 2008/0162295 A1 | 7/2008 | Bedier |
| 2008/0189186 A1 | 8/2008 | Choi et al. |
| 2008/0319869 A1 | 12/2008 | Carlson et al. |
| 2010/0094755 A1 | 4/2010 | Kloster |
| 2012/0030083 A1 * | 2/2012 | Newman ................ G06Q 40/00 |
| | | 705/35 |
| 2013/0018757 A1 | 1/2013 | Anderson |

OTHER PUBLICATIONS http://web.archive.org/web/20040208153252/http://www.bigbiz.com/forms.html, Feb. 2004, (Year: 2004).*

Retrieved from the internet: http://web. arch ive.org/web/20040208153252/http :/ /www. bigbiz.com/forms. html, Feb. 2004.

Paypal Website Payments Standard Checkout Integration Guide, Nov. 2005.

U.S. Appl. No. 61/506,425 , Hosted Order Page Payment Type Selection, filed Jul. 11, 2011, 13 pages.

Notice of Allowance, U.S. Appl. No. 13/549,187, dated Jan. 11, 2017, 18 pages.

Final Office Action, U.S. Appl. No. 13/549,187, dated Aug. 3, 2016, 36 pages.

Non-final Rejection, U.S. Appl. No. 13/549,187, dated Mar. 10, 2016, 30 pages.

Final Office Action, U.S. Appl. No. 13/549,187, dated Oct. 16, 2015 21 pages.

Non-final Office Action, U.S. Appl. No. 13/549,187, dated Apr. 22, 2015, 14 pages.

* cited by examiner

METHOD AND SYSTEM FOR HOSTED ORDER PAGE/SILENT ORDER POST

CROSS-REFERENCES TO RELATED APPLICATIONS

This application is a continuation application of and claims priority to application Ser. No. 15/465,463, entitled "Method and System for Hosted Order Page/Silent Order Post Plus Fraud Detection", filed Mar. 21, 2017, which is a continuation and claims priority to application Ser. No. 13/549,187 entitled "Method and System for Hosted Order Page/Silent Order Post Plus Fraud Detection", filed Jul. 13, 2012, which claims priority to U.S. Provisional Application No. 61/508,563, filed on Jul. 15, 2011, the entire contents of which are herein incorporated by reference for all purposes.

BACKGROUND

1. Field of the Art

Generally, payment processing for online retail businesses is described. Specifically, third party assisted payment card processing and fraud detection are described.

2. Discussion of the Related Art

A "hosted order page" (HOP) is a third-party hosted webpage that accepts payment information from customers on behalf of merchants. A merchant website typically redirects a customer to a HOP on the third-party's domain/server when the customer selects a 'Buy' or 'Checkout' button from an online shopping cart. Once at the HOP, the customer inputs payment information, such as credit card information. The third-party, which is neither the merchant nor the customer, uses the payment information entered by the customer to process the payment transaction for the merchant so that the merchant can avoid handling the customer's payment information, and thereby avoid the cost and effort of complying with the Payment Card Industry Data Security Standard (PCIDSS) and government regulations regarding storing sensitive payment information.

A "silent order post" (SOP) is akin to a HOP but with only the sensitive textboxes and other input controls being hosted by the third party. That is, the merchant hosts the order page but the sensitive fields, such as the credit card number and expiration date entry textboxes, are posted only to the third party's servers.

Oftentimes merchants rely on third-parties to apply fraud detection screens to individual purchase transactions and, in real time, advise the merchants regarding whether to deny transactions because the risk of fraud is too high or to accept transactions because the risk is low or otherwise acceptable. For such third-party fraud detection screens to be particularly useful, adequate information about the purchase transactions needs to be provided, including payment information as well as order information. Payment information includes, for example, credit card number, billing address, and expiration date. On the other hand, order information includes information such as item descriptions, shipping instructions (next day, overnight, etc.), special instructions (e.g., gift wrapping requested), etc. However, in transactions where third-party entities use HOPs or SOPs to obtain payment information directly from consumers on behalf of merchants, these third-party entities have no way of also obtaining order information, and thus can only use payment information when evaluating fraud risk in transactions.

BRIEF SUMMARY

Embodiments of the invention relate to example methods, computer readable medium, servers and systems for enabling merchants to use HOPs and SOPs and thereby avoid handling payment information and the costs associated PCI compliance, while at the same time enabling merchants to utilize third-party fraud detection screens informed by both payment and order information and thereby avail themselves of robust fraud detection and reduced costs associated with detecting and declining fraudulent transactions.

An embodiment relates to a method comprising redirecting order information from a merchant server through a user device to a payment service, the order information being associated with a purchase transaction involving a user and a merchant, receiving, at the payment service, payment information from the user who is engaging in the purchase transaction with the merchant, wherein the payment information is sent to the payment service from the user device and wherein the payment information bypasses the merchant server, transmitting the payment information and the order information from the payment service to a fraud detection service, wherein the fraud detection service uses the payment information and the order information to evaluate risk for the purchase transaction, receiving, at the payment service, an approve/deny indication from the fraud detection service, and processing, at the payment service, the purchase transaction using the payment information received from the user device when the approve/deny indication indicates that the purchase transaction should be approved.

Another embodiment relates to system comprising a processor and a memory device including instructions that, when executed by the processor, cause the processor to receive order information from a merchant server via a redirect through a user device, the order information being associated with a purchase transaction involving a user and a merchant, receive payment information from the user device of the user who is engaging in the purchase transaction with the merchant, wherein the payment information bypasses the merchant server, evaluate the payment information and the order information to determine fraud risk for the purchase transaction, and process the purchase transaction using the payment information received from the user device if the fraud risk is acceptable.

Yet another embodiment relates to a method comprising obtaining order information from a merchant server via a post from a user device when the user device is redirected from the merchant server, the order information being associated with a purchase transaction involving a user and a merchant, hosting an order page on behalf of the merchant, wherein the hosted order page is presented to the user via the user device, obtaining, via the hosted order page, payment information from the user on behalf of the merchant, evaluating the payment information and the order information to determine fraud risk for the purchase transaction, and processing the purchase transaction using the payment information if the fraud risk is acceptable.

Other embodiments of the invention are directed to computer readable media comprising code for performing the above-described methods as well as systems, apparatuses and devices that perform the methods and/or that use the computer readable media.

These and other embodiments of the invention are described in further detail below.

DETAILED DESCRIPTION

Example embodiments relate to example methods, computer readable medium, servers and systems for enabling merchants to use HOPs and SOPs and thereby avoid handling payment information and the costs associated PCI compliance, while at the same time enabling merchants to utilize third-party fraud detection screens informed by both payment and order information and thereby avail themselves of robust fraud detection and reduced costs associated with avoiding fraudulent transactions. Thus, the example methods, computer readable medium, servers and systems provide the advantage of enabling merchants to save money by reducing fraud as well as save money by avoiding the costs associated with becoming PCI compliant.

A "purchase transaction" can be an electronic transaction involving a user, such as a consumer, and a merchant, where the user purchases an item or service from the merchant. An example includes a consumer making an online credit-card purchase on a merchant website.

"Order information" may include information about an electronic transaction, such as information about the item(s) to be purchased, payment amounts, sales tax, shipping address, shipping type (e.g., overnight, one-day, standard), carrier, shipping & handling costs, special requests (e.g., gift wrapping), etc. It may also include information about the consumer making the transactions, such as name, address, email address, purchase history, profile information, and any other information that may be used to measure the level of risk associated with the electronic transaction.

"Payment information" may include information associated with financial accounts, such credit-card accounts, debit-card accounts, demand accounts (e.g., checking accounts, money market accounts), prepaid accounts, eWallet accounts, etc. Examples of such information include payment account numbers ("PANs"), expiration dates, bank routing numbers, checking account numbers, etc.

A "payment service" may be a service that obtains payment data and uses the payment data to process purchase transactions on behalf of merchants and other entities.

A "fraud detection service" can be a service that evaluates fraud risk in purchase transactions. Such fraud evaluations may be based at least in part on payment information and order information.

A "merchant service provider" can be any entity that provides services in support of electronic transactions. Examples of such services include using HOPs and/or SOPs to collect payment information and/or order information and using that information to process purchase transactions and/or evaluate fraud risk in purchase transactions. A merchant service provider may include both a payment service and a fraud detection service.

Figure 1:
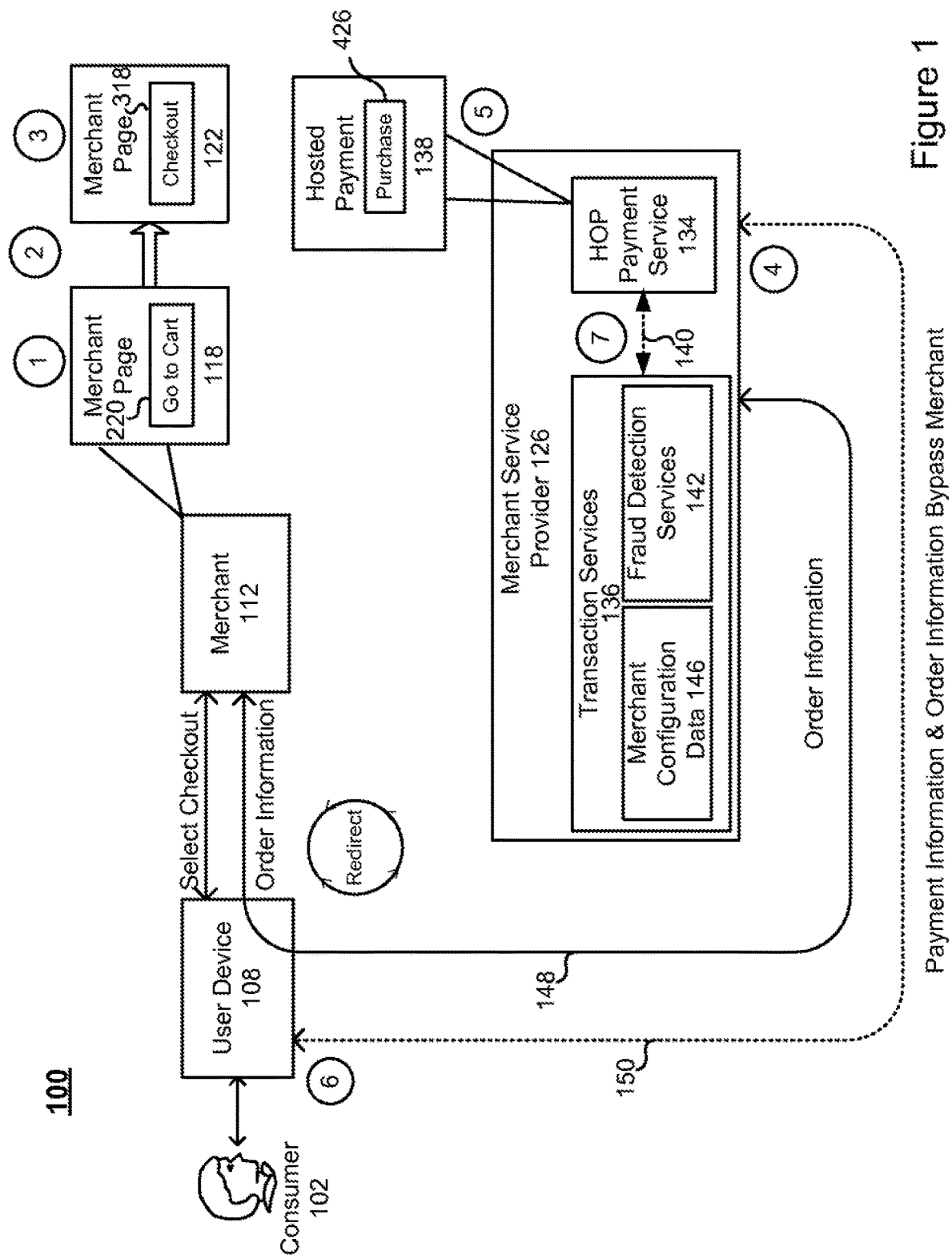
FIG. 1 provides a block diagram of an example operating environment in which embodiments of the invention can be implemented.

FIG. 1 is a block diagram of an example of an operating system 100 in which embodiments of the invention can be implemented.

FIG. 1 depicts a consumer 102, a user device 108 associated with the consumer 102, a merchant 112 and associated merchant pages 118 and 122, and a merchant service provider 126 ("service provider"), communicatively connected. The service provider 126 includes transaction services 136, which include fraud detection services 142, merchant configuration data 146, and HOP services having an associated hosted payment page 138. The system 100 illustrated in FIG. 1 is referred to as a hosted service system 100, wherein the service provider 126, acting as a "host", hosts services for clients, such as the merchant 112. According to the illustrated embodiment, the merchant 112 and the consumer 102 can transmit information associated with electronic transactions to the service provider 126. According to some embodiments, the merchant 112 may transmit information, such as order information, to the service provider 126, which performs one or more services based at least on the transaction information received from the merchant 112.

The consumer 102 is, generally, any entity that is a purchaser of products or services via an electronic transaction. Non-limiting examples include a person who purchases or licenses goods at a retail store using a credit card, a person who purchases or licenses goods through the public Internet, and a business representative who purchases a business commodity or service through the public Internet. The merchant 112 is, generally, any entity that offers goods or services in exchange for value.

The service provider 126 is a third party, other than the consumer and merchant, that provides services in support of electronic transactions. Non-limiting examples of such services include services related to payment acceptance processing (e.g., HOP and SOP), credit card authorization, risk evaluation and management, fraud screening, tax calculation, export compliance verification, delivery address verification, Internet and/or e-mail address verification, payment crediting, billing, and the like. Service providers 126 may invoke service features of other service providers in support of their service offerings.

The consumer 102 and the merchant 112 may communicate through a network, such as with Internet-originated transactions. As part of a purchasing process, certain information is collected from the consumer 102 by the merchant 112. Non-limiting examples of information collected from the consumer 102 include information about the item to be purchased, payment amount, and shipping address. However, as discussed above, some merchants may opt to not collect payment information, such as credit or bank card payment account numbers. Typically merchants opt not to collect payment information because the merchants want to avoid the costs associated with PCI compliance.

Once various transaction and customer-related information is collected by the merchant 112, the merchant transmits at least a portion of the information to the service provider 126. Additional information may be transmitted along with the information described. For example, the merchant 112 may transmit customized data or a specification of service provider 126 services to apply, or to ignore, in the electronic transaction processing that is provided by the service provider 126. Furthermore, according to embodiments described herein, customer-specified service strategies and schedules may also be transmitted from the merchant 112 to the service provider 126. Any or all of the information referenced above, which is transmitted from the merchant 112 to the service provider 126, may be transmitted through a network in any suitable protocol. An example of a suitable protocol is Secure Sockets Layer (SSL).

The service provider 126 performs one or more services in relation to the electronic commercial transaction associated with transmitted transaction information. Typically, when not implementing embodiments described herein, the service provider 126 performs services in a manner predetermined by the service provider 126. For example, specific services are performed in a specific order for specific merchants 112, according to a service provider default or to an agreement between the merchant 112 and the service provider 126.

An example will now be provided with reference to the encircled reference numerals 1-8 provided in FIG. 1. It should be appreciated that the encircled reference numerals are provided for illustrative convenience and are not intended to limit ways in which data may flow or the order in which steps may be executed in the system 100. For example, data may flow to and from any component of the system 100 in any order. This example will be discussed with reference to FIGS. 1-4.

Figure 2:
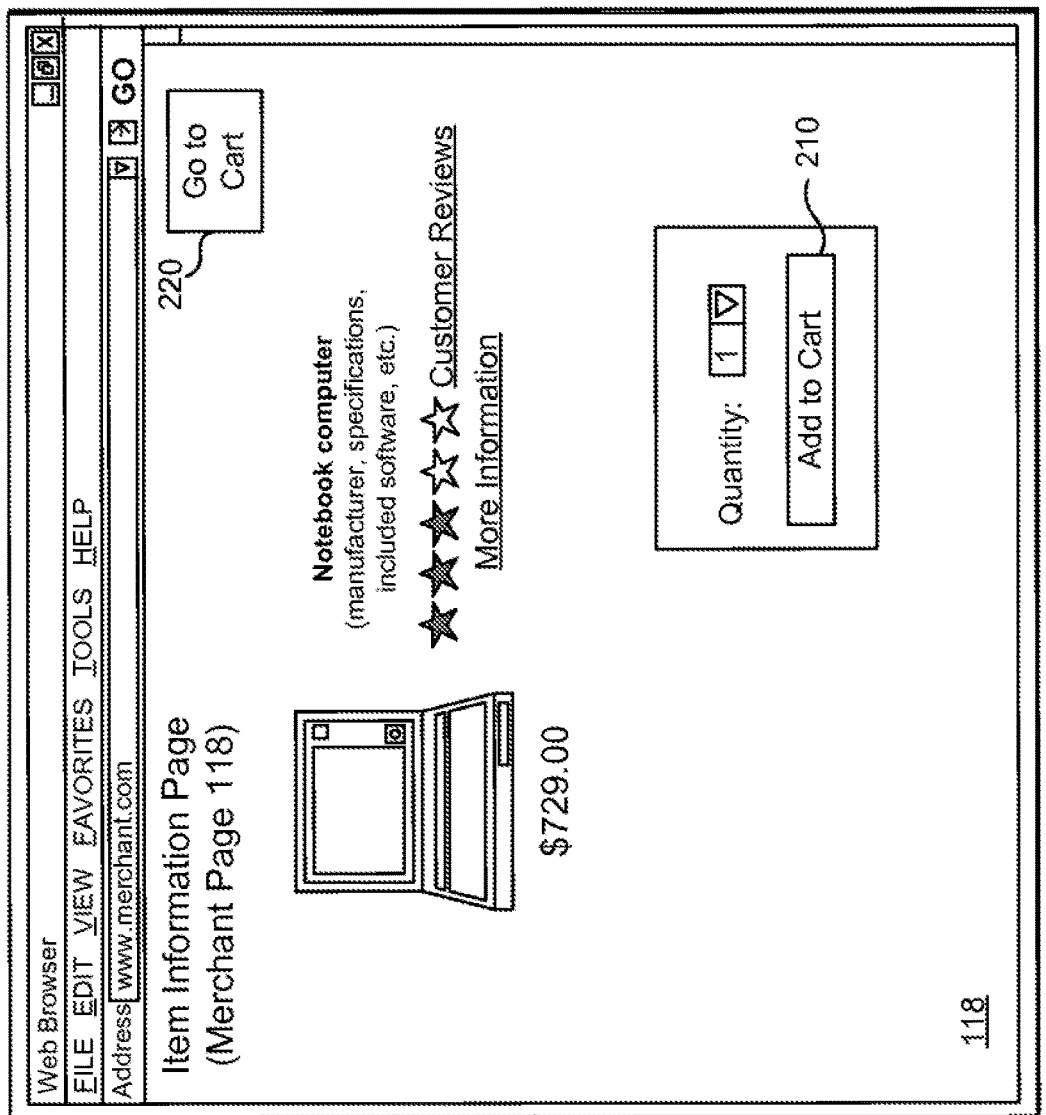
FIG. 2 provides an illustration of an example merchant webpage, according to an embodiment.
Figure 2:
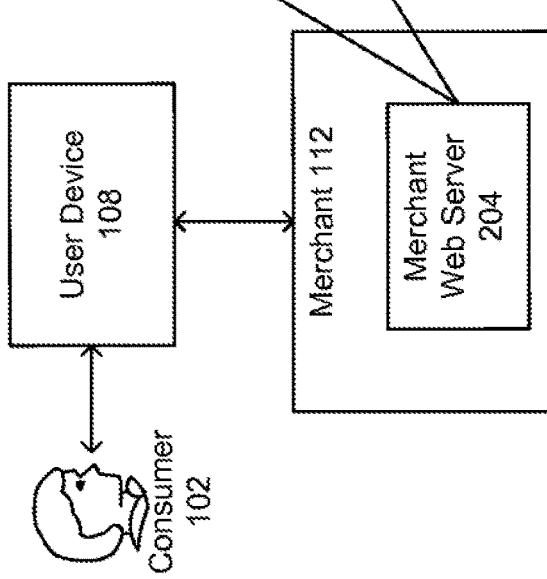

Referring to encircled reference numeral 1 of FIG. 1, this example begins with the consumer 102 visiting the merchant page 118 (see FIG. 2), which is provided by a merchant web server 204. While visiting the merchant page 118, the consumer 102 can view details for a particular item. For example, as illustrated in FIG. 2, the consumer 102 may view details of the item, which is a notebook computer. Further, while visiting the merchant page 118, the consumer 102 may select the "Add to Cart" button 210 to add the item to his or her electronic shopping cart. Further, the consumer 102 may select the "Go to Cart" button 220 to navigate to a webpage that displays order information for the items that are in the consumer's electronic shopping cart.

Figure 3:
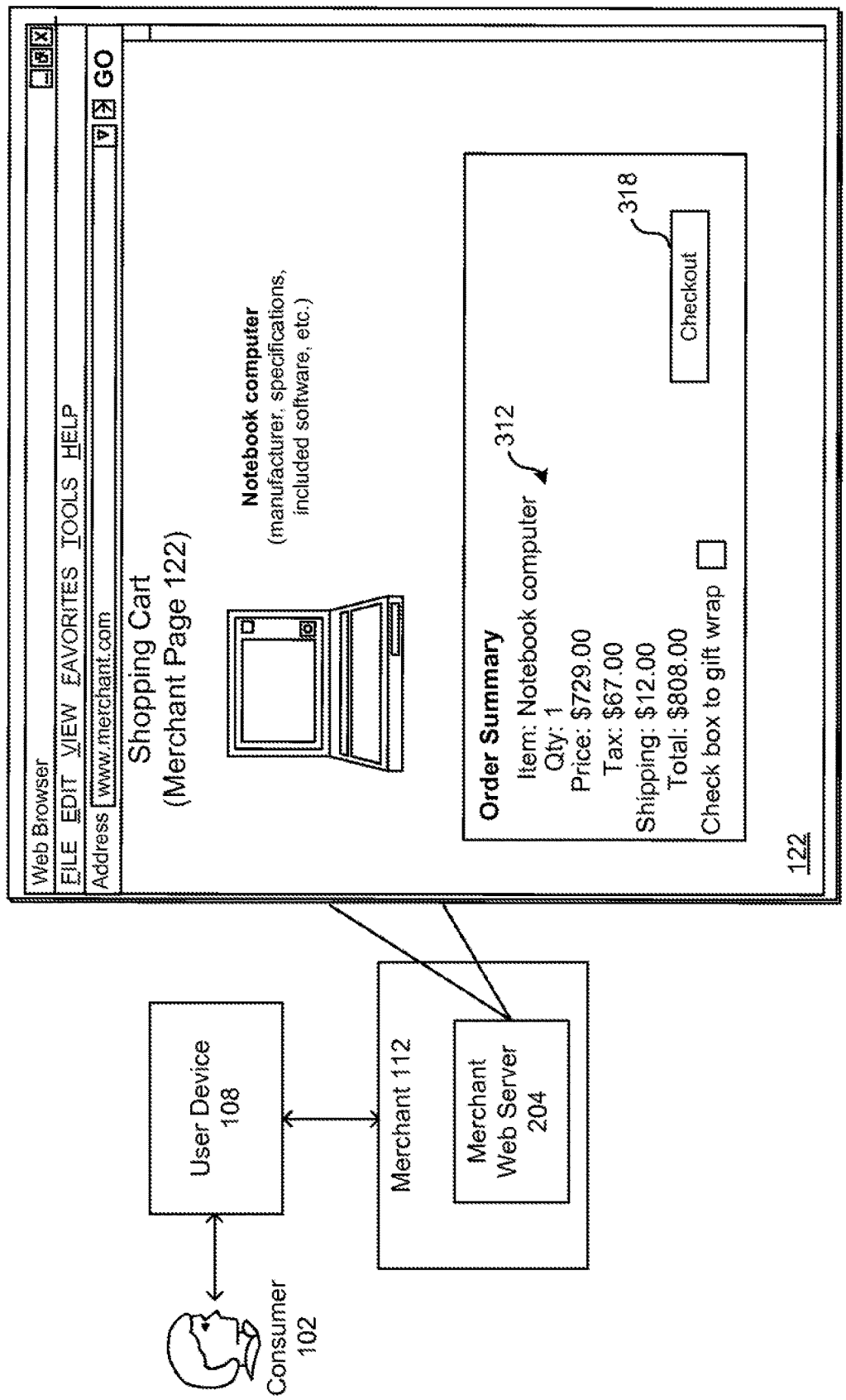
FIG. 3 provides an illustration of an example merchant webpage, according to an embodiment.
Figure 4:
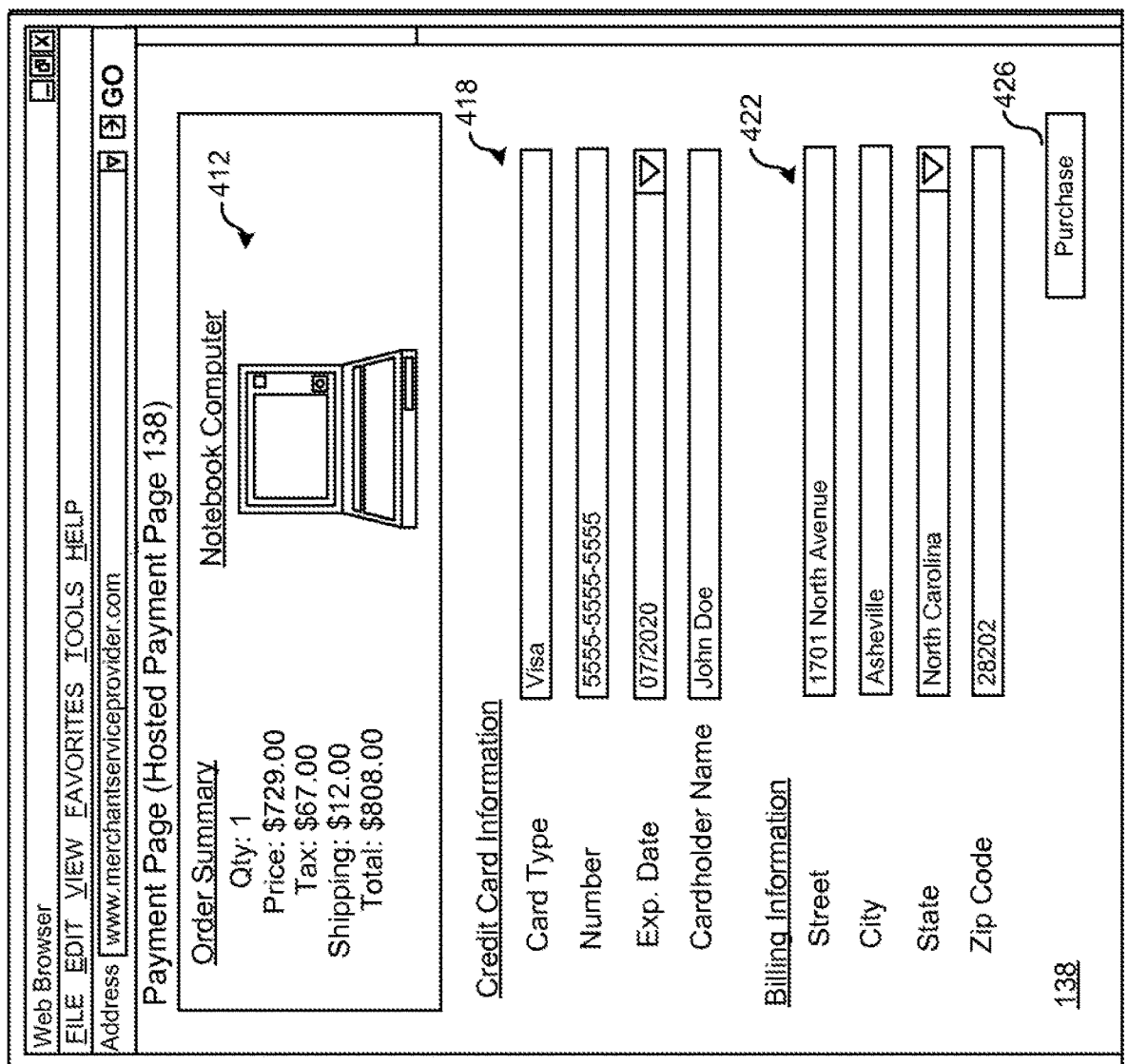
FIG. 4 provides an illustration of an example hosted order webpage, according to an embodiment.
Figure 4:
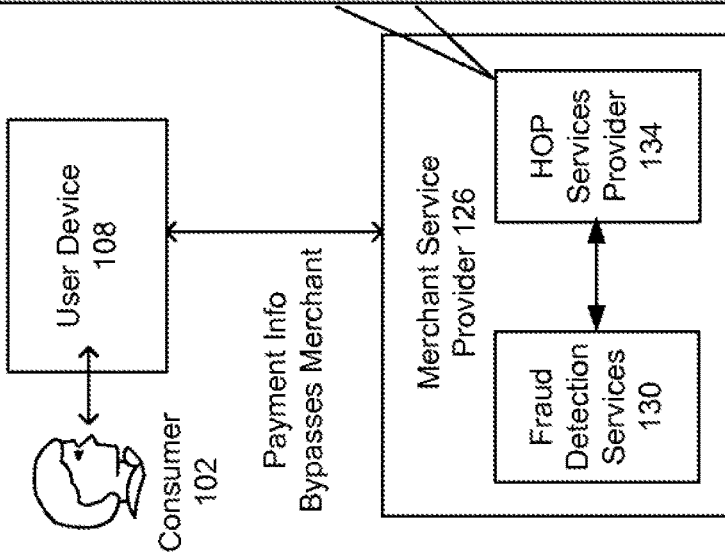

Referring now to encircled reference numeral 2, when the consumer selects the "Add to Cart" button 210, the merchant server 204 obtains the order information for the items in the shopping cart and creates a one-way hash of the order information. Here, for example, the order information is form-filled data that is hidden from the consumer 102. For example, when the consumer 102 presses the "Go to Cart" button 220, the merchant 112 obtains order information from the shopping cart, creates the one-way hash of the information, and then, as indicated at encircled reference number 3, provides the one-way hash and order information to the merchant page 122, an example of which is illustrated in FIG. 3. According to an embodiment, script provided to the merchant 112 by the service provider 126 resides on the merchant server 204 and generates the one-way hash.

As illustrated in FIG. 3, the merchant page 122 may be a shopping cart page that provides a summary of order information 312, which, beyond what is illustrated in FIG. 3, may include, for example, an order number, customer information, item information (e.g., SKU data), etc. As indicated at encircled reference numeral 4 of FIG. 1, when the consumer 102 presses the "Checkout" button 318 on the merchant page 122, the merchant server 204 sends the order information 312 and the one-way hash to the HOP services provider 134 of the service provider 126. For example, the "Checkout" button 318 may include a URL that redirects the user device 108 to a location at the HOP services provider 134. When the redirect occurs, the order information and the one-way hash are transmitted via the SSL pipe 148 from the merchant server 204 of the merchant 112 to the HOP services provider 134 by way of the redirect through the user device 108. In this example, the one-way hash and order information are provided to the HOP services provider 134 in an HTML post.

Referring to encircled reference number 5, the HOP services provider 134 verifies the one-way hash provided by the merchant by applying its own copy of the hashing script to the order information to generate its own one-way hash of the order information and then comparing the hash it generates to the hash provided by the merchant. If the one-way hash is verified and thereby confirms that the order information was not tampered with during transmission from the merchant 112, then the HOP services provider 134 provides the hosted payment page 138 to the consumer 102, where the hosted payment page is populated with at least some of the order information. An example of the hosted payment page 138 is provided in FIG. 4. For example, the hosted payment page 138 may include a summary of the order information 412, payment input fields 418 into which users may input their credit card information, e.g., credit card type, number, expiration data, etc., and input fields 422 into which user may input billing address information for the credit card, and a "Purchase" button 426 that user may select to submit their order. Thus, when the user inputs his payment information and clicks on the "Purchase" button 426, the order information and the payment information may be combined into a single transaction that is submitted to the HOP services provider 134.

Referring to encircled reference number 6, the consumer 102, via the user device 108, inputs the payment information. For example, the consumer 102 inputs his or her credit card information into input fields 418 and his or her billing address information into input fields 422 and then presses the "Purchase" button 426.

It should be noted that, in the illustrated example, the payment information is transmitted via SSL pipe 150 from the user device 108 to the HOP services provider 134 and bypasses the merchant 112 altogether. Thus, the merchant 112 does not handle the payment information and therefore does not have to be PCI compliant. Referring to encircled reference number 7, when the consumer 102 presses the "Purchase" button 426 and sends the payment information to the HOP services provider 134, the HOP services provider 134 sends the payment information received from the consumer 102 as well as the order information received from the merchant 112 to the transaction services 136 via link 140. The transaction services 136 accesses the merchant configurations data 146 to determine whether the merchant 122 has enabled fraud detection services. If the merchant 112 has enabled fraud detection services, then the transaction services 136 enables the fraud detection services 142 to run the payment information as well as the order information through a plurality of fraud detection algorithms to assess the risk associated with the transaction and to provide an approve/deny indication.

After the fraud detection services 142 provides the approve/deny indication, the transaction services 136 passes the indication to the HOP services provider 134 via the link 140. The HOP services provider hashes the indication and then sends the hash and the indication to the merchant 112, which verifies the hash and responds accordingly. Further, according to some embodiments, after the fraud detection services 142 provides the approve/deny indication, the transaction services 136 again references the merchant configurations data 146 to determine response configurations that were pre-designated by the merchant 112. For example, the response configurations of the merchant configurations data 146 may specify "if approved, instruct HOP Services Provider 134 to display a default confirmation page"; "if approved, instruct HOP Services Provider 134 to redirect consumer 102 back to merchant's 112 website"; "if approved, instruct HOP Services Provider 134 to display default confirm page and send a confirmation email to the consumer and/or the merchant"; "if denied, instruct HOP Services Provider 134 to display a default decline page and/or instruct consumer 102 to provide another form of payment"; or "if denied, instruct HOP Services Provider 134 to redirect consumer back to merchant's 112 website."

Figure 5:
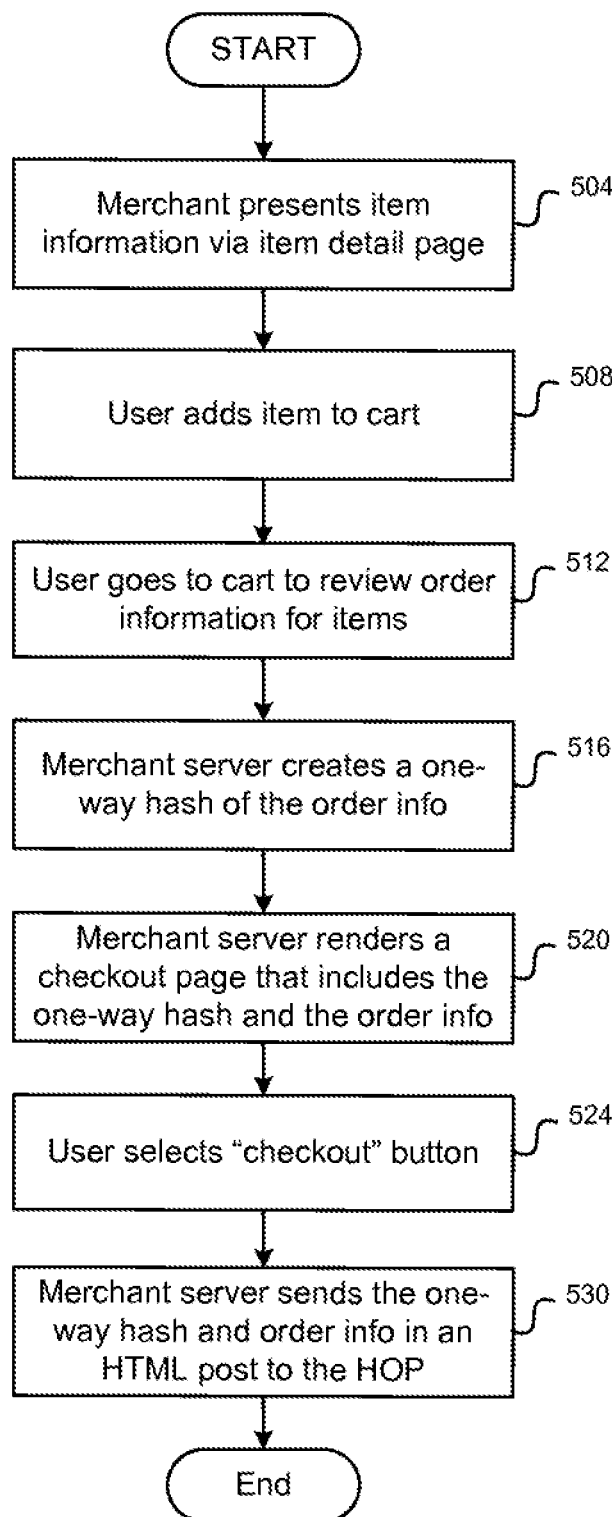
FIG. 5 provides a flow diagram of an example process for enabling a merchant to securely send order information to a merchant service provider, according to an embodiment.

An example process 500 is provided in FIG. 5 whereby the process enables a merchant to securely send order information to a merchant service provider, according to an embodiment. According to embodiments, a merchant 112 presents item information about a particular item to a consumer 102 via an item detail page (504), such as the merchant page 118 of FIG. 2. In the illustrated embodiment, the merchant web server 204 generates the merchant page 118 and the consumer 102 can view the page 118 via the user device 108. Next, the consumer 102 adds the item to the consumer's shopping cart (508). For example, as illustrated in FIG. 2, the consumer 102 presses the "Add to Cart" button 210. After the consumer 102 adds the item to the shopping cart, the consumer 102 navigates to the shopping cart for the purpose of checking out and buying the item (512). For example, as illustrated in FIGS. 2 and 3, the consumer 102 presses the "Go to Cart" button 220 of the merchant page 118 and thereby causes the web server 204 to take the consumer 102 to the merchant page 122 (e.g., the shopping cart page) of FIG. 3, where the consumer 102 can review the order information 312.

In operation, according to some embodiments, upon the consumer 102 pressing the "Go to Cart" button 220, the merchant web server 204 obtains the order information for the items to be displayed in the shopping cart and applies a hashing script/program to the order information to generate a one-way hash of the order information (516). The merchant web server 204 provides the hash and order information in the shopping cart page 122 (520). For example, the hash and order information are provided in an HTML post. If the consumer 102 intends to purchase the items presented on the shopping cart page, then the consumer 102 presses the "Checkout" button 318 (524) and thereby causes the merchant web server 204 to send the order information and the one-way hash of the order information to the HOP services provider 134 (530). For example, the merchant web server 204 sends the order information and the hash to the HOP services provider 134 via the consumer device 108 in the form of an HTML post.

Figure 6:
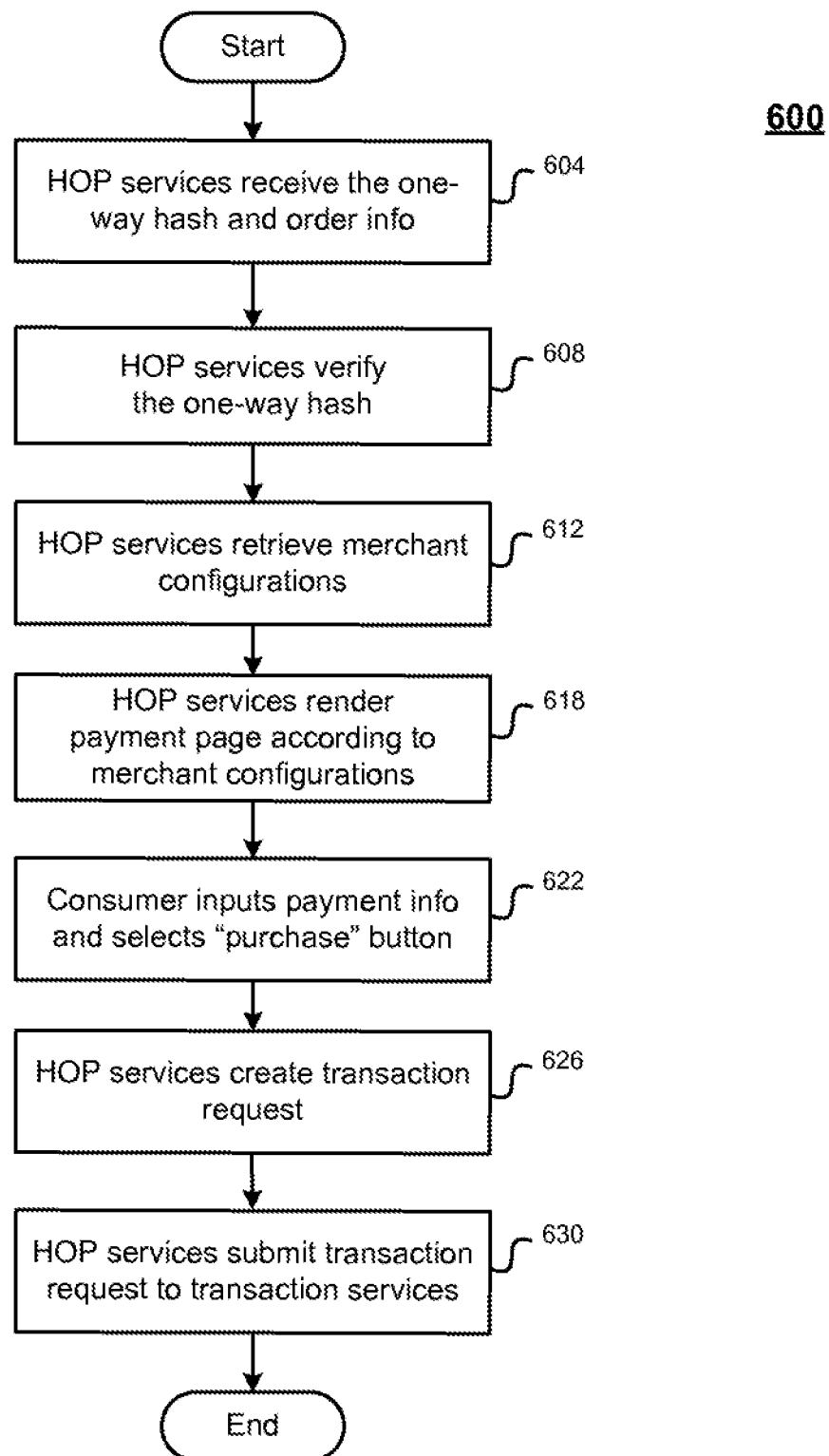
FIG. 6 provides a flow diagram of an example process for enabling a HOP services provider to submit payment information and order information to a fraud detection services provider, according to an embodiment.

An example process 600 is provided in FIG. 6 whereby the process enables an HOP services provider to submit payment information and order information to a fraud detection services provider, according to an embodiment. According to embodiments, the HOP services provider 134 receives the order information and the hash of the order information from the merchant web server 204 (604), and the HOP services provider 134 verifies the hash provided by the merchant (608). For example, the HOP services provider applies its own copy of the hashing script to the order information to generate its own hash of the order information and then compares the hash it generated to the hash provided by the merchant. If the hash is verified, then the HOP services provider 134 searches the merchant configurations data 146 to obtain the merchant's 112 configurations regarding rendering the hosted payment page to the customer on behalf of the merchant (612). For example, the merchant 112 may specify that the hosted payment page (e.g., page 138 of FIG. 4) only provide input fields for collecting payment information or that it provide input fields for collecting payment information as well as the relevant order summary information.

The HOP services provider 134 renders the payment page according to the merchant's configurations (618), and the consumer 102 may input and submit payment information (622). For example, the HOP services provider 134 may render a hosted webpage such as the hosted payment page 138 illustrated in FIG. 4. Upon viewing the hosted payment page via the user device 108, the consumer 102 may use the consumer device 108 to review the order information 412, input credit card information into the payment input fields 418, and input billing address information into the billing address information fields 422. After reviewing and inputting information, the consumer 102 may submit the payment information to the HOP services provider 134 by selecting the "Place Order" button 426. As discussed, in the illustrated example, the payment information is transmitted from the user device 108 to the HOP services provider 134 via the SSL pipe 148 and bypasses the merchant 112. Thus, the merchant does not handle the payment information and therefore does not have to be PCI compliant. The HOP services provider 134 creates a transaction request that includes the payment information received from the consumer 102 as well as the order information received from the merchant 112 (626) and sends the transaction request to transaction services 136 (630).

Figure 7:
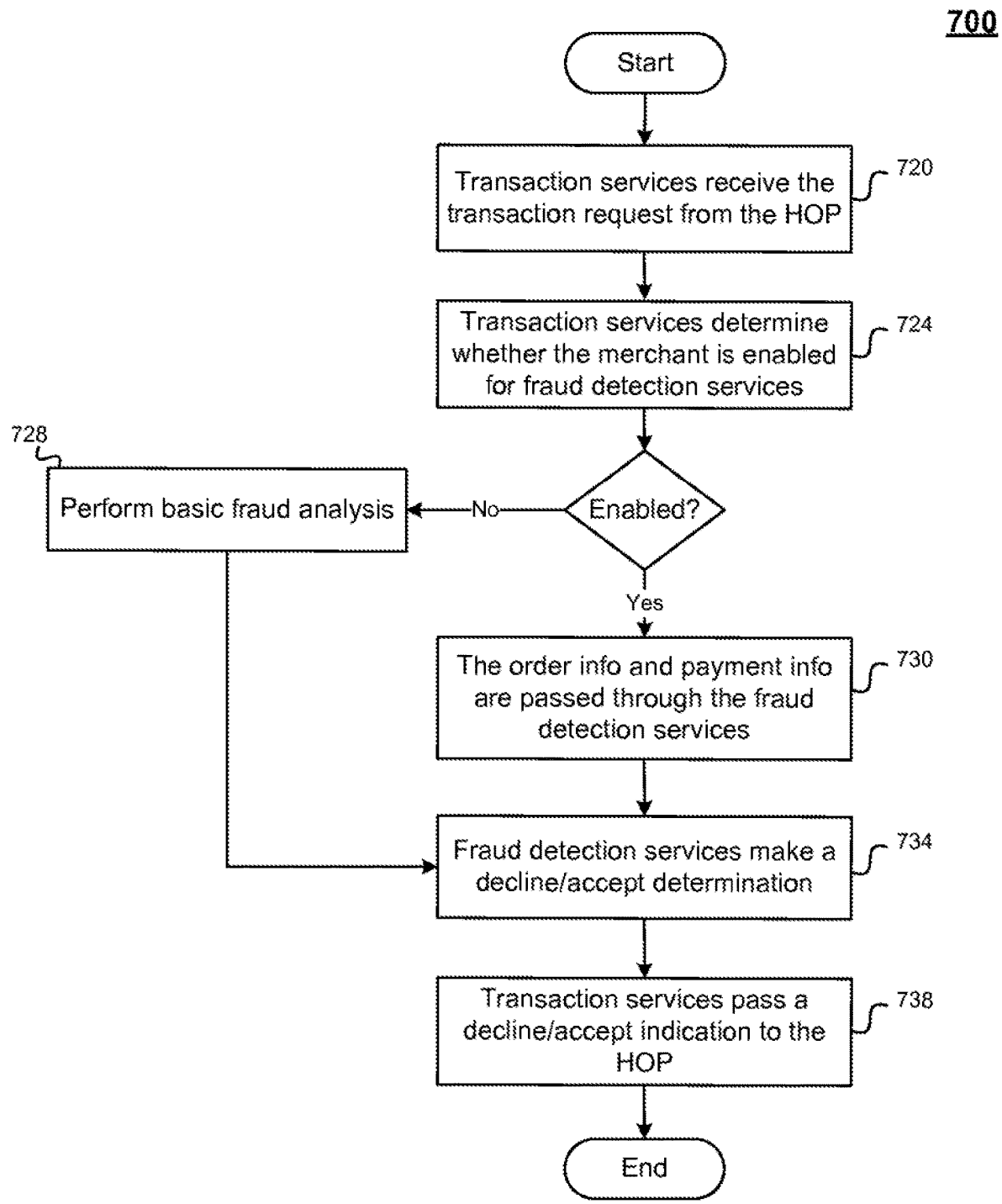
FIG. 7 provides a flow diagram of an example process for enabling a fraud detection service provider to evaluate the fraud risk associated with a transaction, according to an embodiment.

An example process 700 is provided in FIG. 7 whereby the process enables a fraud detection service provider to evaluate the fraud risk associated with a transaction and provide an accept/decline indication, according to an embodiment. According to embodiments, the transaction services 136 receives the transaction request from the HOP service provider 134 (720). The transaction services 136 accesses the merchant configuration data 146 to determine whether the merchant is enabled for fraud detection services (724). For example, some merchant may choose not to elect fraud detection services for some or all of its transactions. If the merchant has not enabled fraud detection services, then the transaction services or some other entity optionally provides a basic fraud analysis on the transaction (728). For example, the transaction services may check to determine whether the credit card is on a black list, whether the associated credit account has sufficient credit, and/or whether the associated deposit account has sufficient funds.

On the other hand, if the merchant has enabled fraud detection services, then the transaction services 136 submits the payment information as well as the order information to the fraud detection services 142 for a fraud detection analysis (730). The fraud detection services 142, in part because it has the order information as well as the payment information, performs comprehensive fraud analysis on the transaction. After completion of the fraud detection analysis, the fraud detection services 142 makes an accept/deny determination for the transaction (734) and passes a decline/accept indication to the transaction services 136, which forwards the indication to the HOP services provider 134 (738).

Figure 8:
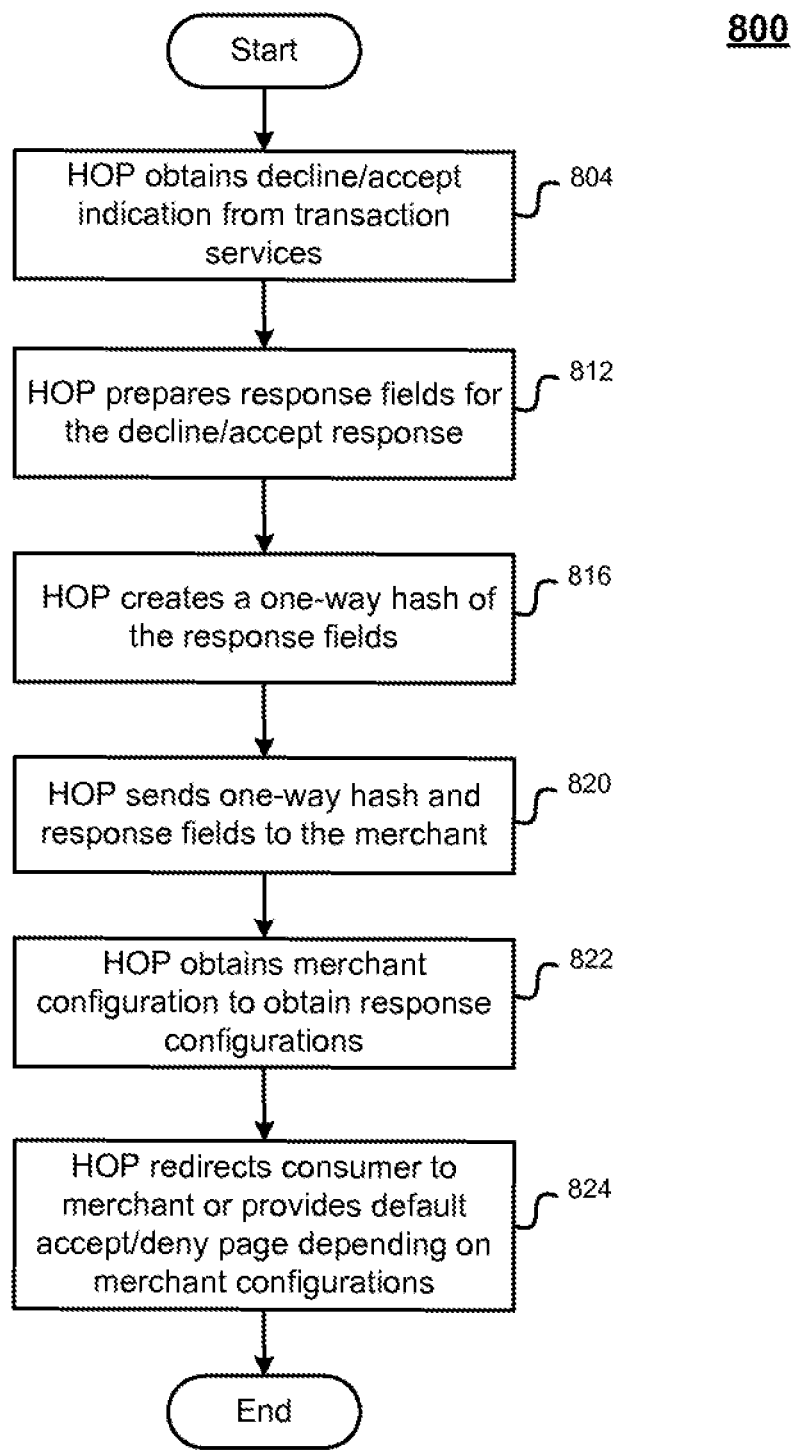
FIG. 8 provides a flow diagram of an example process for sending an accept/decline response to a merchant, according to an embodiment.

An example process 800 is provided in FIG. 8 whereby the process enables sending an accept/decline response to a merchant according to the merchant's configurations, according to an embodiment. According to embodiments, the HOP services provider 134 receives the accept/deny indication from transaction services 136 (804) via link 140. The HOP services provider 134 prepares response fields for the decline/accept response (812) in accordance with the accept/deny indication. For example, the HOP services provider 134 prepares response fields that indicate whether the transaction was denied or accepted. The HOP services provider 134, after preparing response fields for the decline/accept response, creates a one-way hash of the response fields (816) and then sends the one-way hash and the response fields to the merchant 114 (820), which verifies the one-way hash to ensure that the accept/deny indication included in the response fields was not tampered with during transmission from the HOP services provider 134 to the merchant 112.

The HOP services provider 134 accesses the merchant configuration data 146 to determine the merchant's specified response configurations (822). For example, the merchant configuration data 146 may specify: "if approved, instruct HOP services provider 134 to display a default confirmation page"; "if approved, instruct HOP services provider 134 to redirect consumer 102 back to merchant's 112 website"; "if approved, instruct HOP services provider 134 to display default confirm page and send a confirmation email to the consumer and/or the merchant"; "if denied, instruct HOP services provider 134 to display a default decline page and/or instruct consumer 102 to provide another form of payment"; or "if denied, instruct HOP services provider 134 to redirect consumer back to merchant's 112 website." The HOP services provider 134 then responds accordingly. For example, the HOP services provider 134 provides a default accept or decline page to the consumer or it redirects the consumer to the merchant 112 (824), etc.

Figure 9:
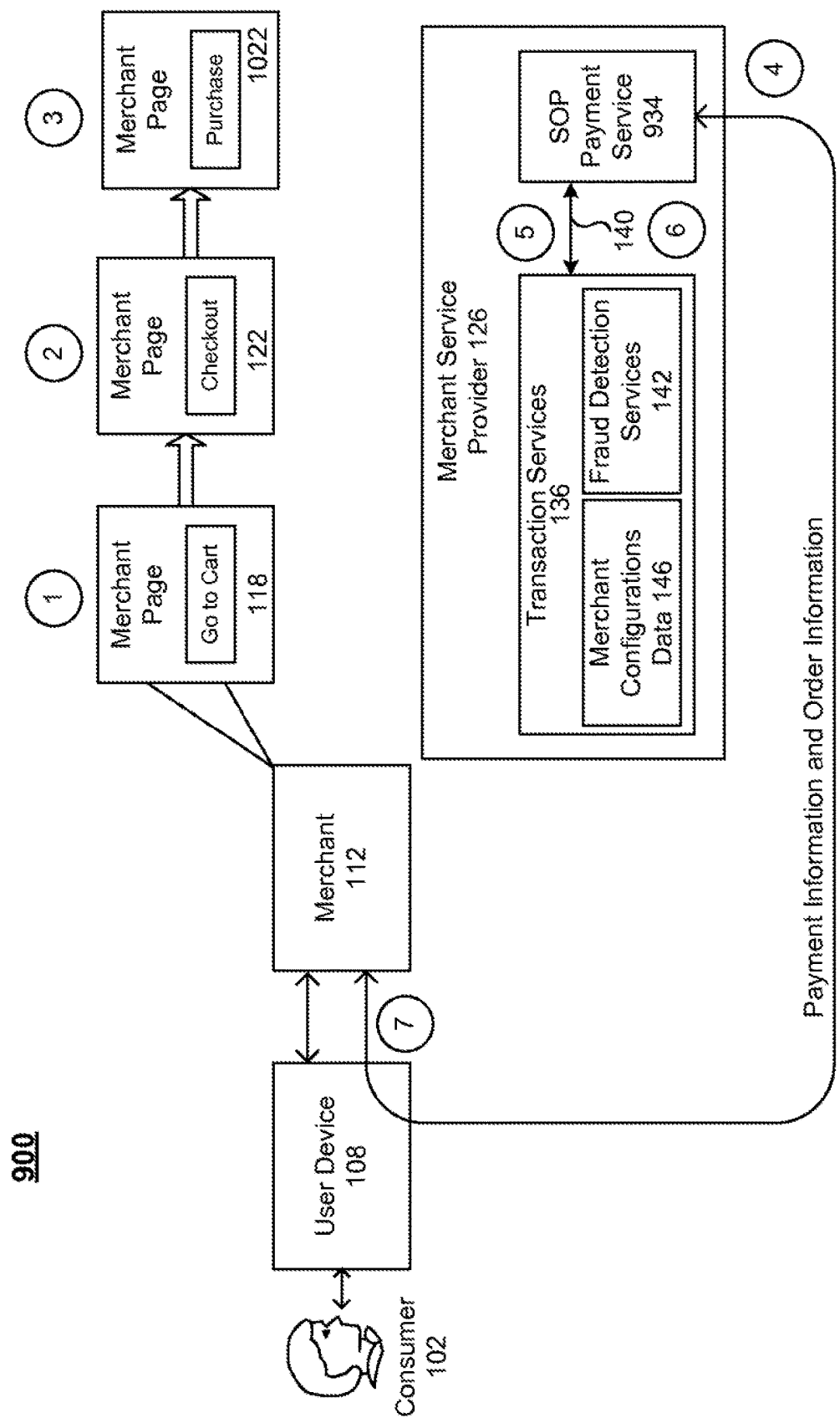
FIG. 9 provides a block diagram of an example operating environment in which embodiments of the invention can be implemented.

FIG. 9 is a block diagram of an example of an operating system 900 in which embodiments of the invention can be implemented.

The system 900 of FIG. 9 includes the same components as the system 100 of FIG. 1 except, instead of having an HOP services provider 134, the system 900 includes an SOP services provider 934. Operation of the system 900 is similar to the operation of system 100 in some regards except, for example, instead of relying on the HOP services provider 134 to host the payment page (e.g., hosted payment page 138 of FIG. 4), the merchant 112 of FIG. 9 hosts its own payment page, an example of which is provided in FIG. 10, and the SOP services provider 934 is used to provide the merchant 112 with an SOP.

Exemplary operation of the system 900 will now be described with reference to the encircled reference numerals 1-8 provided in FIG. 9. It should be appreciated that the encircled reference numerals are provided for illustrative convenience and are not intended to limit ways in which data may flow or the order in which steps may be executed in the system 900. For example, data may flow to and from any component of the system 900 in any order. This example will be discussed with reference to FIGS. 2, 3, and 10.

Referring to encircled reference numeral 1, this example begins with the consumer 102 visiting the merchant page 118 (see FIG. 2), which is provided by a merchant web server 204. While visiting the merchant page 118, the consumer 102 can view details for a particular item and the consumer 102 may select the "Add to Cart" button 210 to add one or more items to his or her electronic shopping cart. Further, as indicated at encircled reference numeral 2, the consumer 102 may select the "Go to Cart" button 220 to navigate to a webpage that displays order information for the items that are in the consumer's electronic shopping cart. The merchant page 122 is an example of such a page and is illustrated in FIG. 3. For example, as illustrated in FIG. 3, the merchant page 122 may provide a summary of the order information 312, which beyond what is illustrated in FIG. 3, may include, for example, an order number, customer information, item information (e.g., SKU data), etc.

Figure 10:
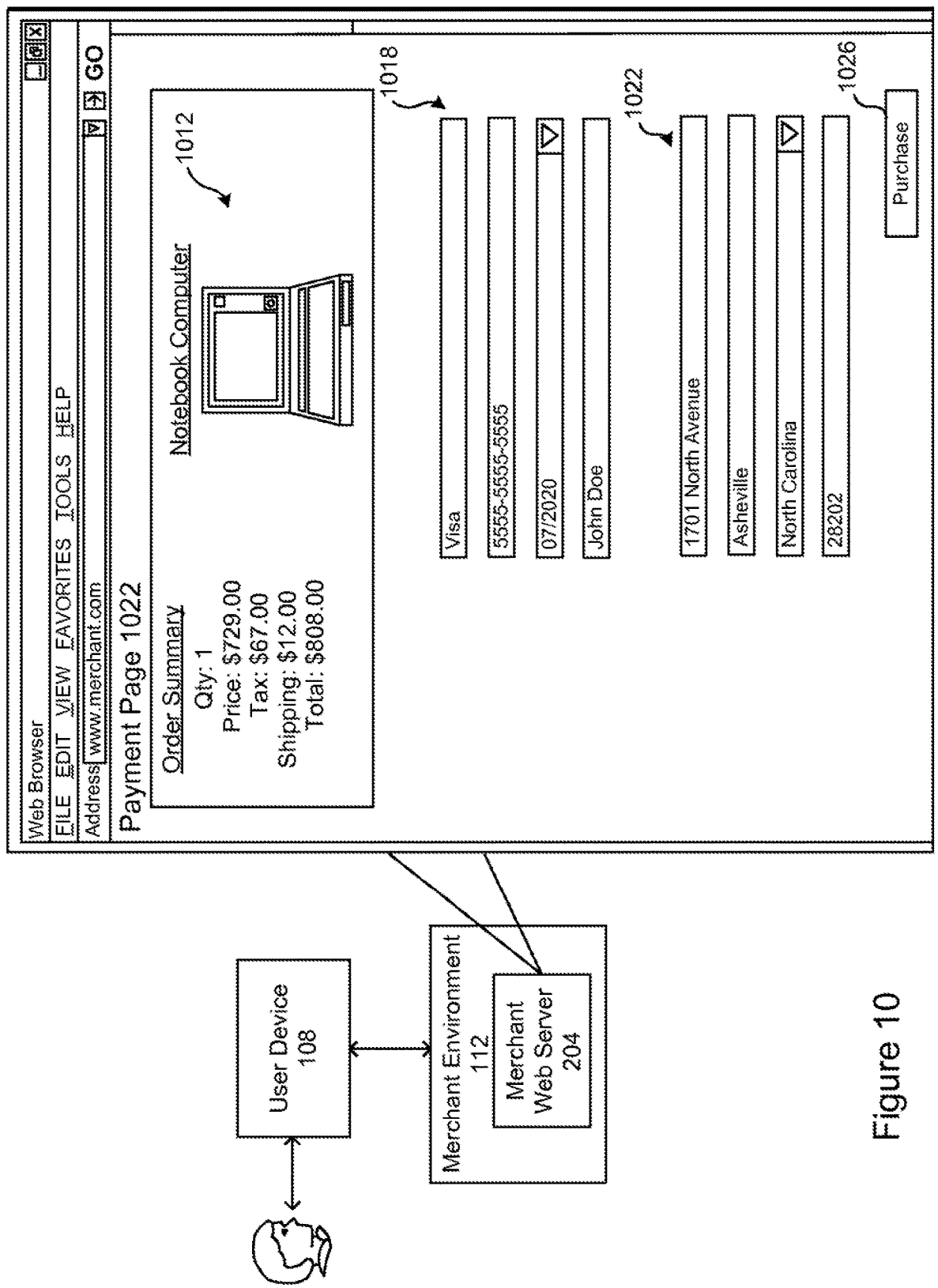
FIG. 10 provides an illustration of an example webpage having hosted input fields, according to an embodiment.

As indicated at encircled reference numeral 3 of FIG. 9, when the consumer 102 presses the "Checkout" button 318 of FIG. 3, the merchant server 204 provides a payment page, an example of which is provided in FIG. 10. For example, the payment page 1022 may include a summary of the order information 1012, input fields 1018 into which users may input their credit card information, e.g., credit card type, number, expiration data, etc., and input fields 1022 into which user may input billing address information for the credit card. The consumer 102, via the user device 108, inputs his or her credit card information into input fields 1018 and his or her billing address information into input fields 1022 and then presses the "Purchase" button 1026. These input fields 1018, 1022 may be hosted by the SOP services provider 934 of the merchant service provider 126.

As indicated at encircled reference numeral 4, after the user inputs his or her payment information into payment page 1022, the merchant 112 transmits the payment information as well as the order information to the SOP services provider 934. It should be noted that, in the illustrated example, the merchant 112 does not store the payment information, but instead transmits the payment information to the SOP services provider 934. Thus, because the merchant 112 does not store payment information, the merchant 112 does not have to be PCI compliant. Referring to encircled reference number 5, the SOP services provider 934 sends the payment information as well as the order information received from the merchant 112 to the transaction services 136, which accesses the merchant configurations data 146 to determine whether the merchant 112 has enabled fraud detection services. If the merchant 112 has enabled fraud detection services, then the transaction services 136 enables the fraud detection services 142 to run the payment information as well as the order information through a plurality of fraud detection algorithms to access the risk associated with the transaction and provide an approve/deny indication.

As indicated at encircled reference numeral 6, after the fraud detection services 142 provides the approve/deny indication, the transaction services 136 sends the approve/deny indication to the SOP services provider 934, which as indicated at encircled reference number 7, sends the approve/deny indication to the merchant 112. The merchant then can deny or approve the transaction with the consumer 102 based on the approve/deny indication provided from the SOP service provider 934. In system 900, the merchant 112 is able to avoid PCI compliance by sending payment information to the merchant services provider 126, yet the merchant 112 is also able to reduce the costs associated with fraud by also sending order information to the merchant service provider 126.

Figure 11:
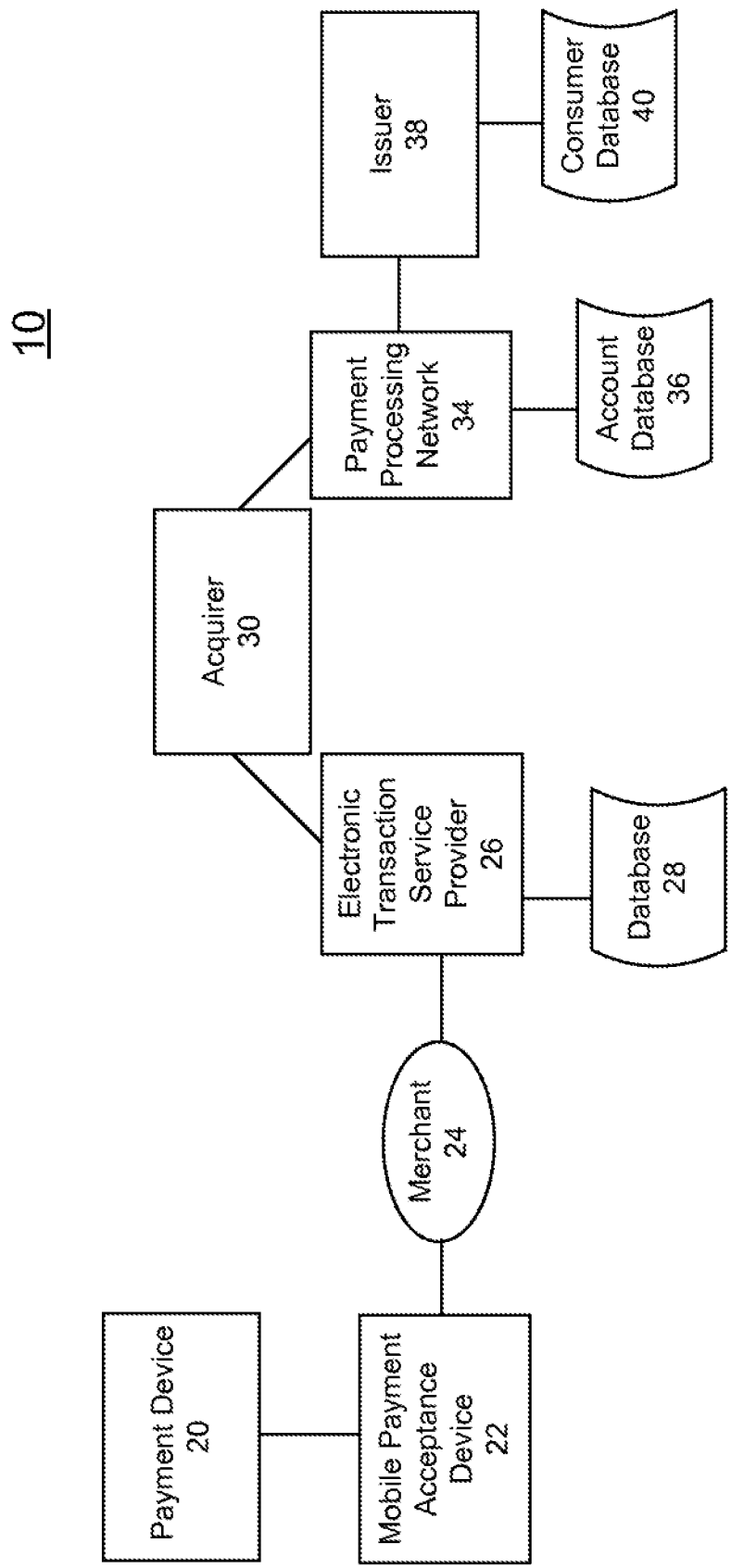
FIG. 11 provides a block diagram of a transaction processing system that may be used with some embodiments of the present invention.

FIG. 11 is a block diagram illustrating a transaction processing system 10 that may be used with some embodiments of the present invention.

FIG. 11 illustrates the primary functional elements that are typically involved in processing a payment transaction and in the authorization process for such a transaction. As shown in FIG. 11, in a typical payment transaction, a consumer wishing to purchase a good or service from a merchant uses a payment device 20 to provide payment transaction data that may be used as part of a consumer authentication or transaction authorization process. Payment device 20 may be a debit card, credit card, smart card, mobile device containing a contactless chip, computer, or other suitable form of device.

The portable payment device is presented to a mobile payment acceptance device 22 of a merchant 24. For example, the acceptance device 22 could be a device reader or point of sale (POS) terminal 22 which is able to access data stored on or within the payment device. In embodiments, the portable payment device communicates account/payment information to the merchant 24 via a "card not present" transaction over a communications network, such as a cellular network, the Internet, etc. The account data (as well as any required consumer data) is communicated to the merchant 24 and ultimately to an merchant service provider 26 (such as AUTHORIZE.NET). As part of the authentication or authorization process performed by the service provider, the service provider 26 may access database 28, which typically stores data regarding the customer/consumer/user (as the result of a registration process with the merchant, for example), the consumer's payment device, and the consumer's transaction history with the merchant. The database 28 may also include information about the merchant 24, such as a list of the merchant's approved mobile payment acceptances device 22. For example, upon receiving information about the payment device 20 from the merchant's mobile payment acceptance device 22, the service provider 26 may extract information that identifies the mobile payment acceptance device 22 and validate that information against a list of approved mobile payment acceptance devices. The service provider 26 typically communicates with acquirer 30 (which manages the merchant's accounts) as part of the overall authentication or authorization process. The service provider 26 and/or acquirer 30 provide data to payment processing network 34, which, among other functions, participates in the clearance and settlement processes that are part of the overall transaction processing.

Communication and data transfer between service provider 26 and payment processing network 34 is typically by means of an intermediary, such as acquirer 30. As part of the consumer authentication or transaction authorization process, payment processing network 34 may access account database 36, which typically contains information regarding the consumer's account payment history, chargeback or transaction dispute history, creditworthiness, etc. Payment processing network 34 communicates with issuer 38 as part of the authentication or authorization process, where issuer 38 is the entity that issued the payment device to the consumer and manages the consumer's account. Customer or consumer account data is typically stored in customer/consumer database 40 which may be accessed by Issuer 38 as part of the authentication, authorization or account management processes. Note that instead of, or in addition to being stored in account database 36, consumer account data may be included in, or otherwise part of customer/consumer database 40.

According to an embodiment, in standard operation, an authorization request message is created by the mobile payment acceptance device 22 during a consumer purchase of a good or service using a portable payment device. In some embodiments, the mobile payment acceptance device 22 of the merchant 24 may be a wireless phone or personal digital assistant that incorporates a contactless card or chip or payment acceptance application. The authorization request message is typically sent from the payment application of the mobile payment acceptance device 22 to the service provider 26, and then to the merchant's acquirer 30, to a payment processing network 34, and then to an issuer 38. An authorization request message can include a request for authorization to conduct an electronic payment transaction and data relevant to determining if the request should be granted as well as device identification information related to the mobile payment acceptance device 22, which the service provider 26 validates against the list of approved mobile payment acceptance devices 22. For example, it may include one or more of an account holders payment account number, currency code, sale amount, merchant transaction stamp, acceptor city, acceptor state/country, etc. An authorization request message may be protected using a secure encryption method (e.g., 128-bit SSL or equivalent) in order to prevent unauthorized access to account or transaction data.

After the issuer receives the authorization request message, the issuer determines if the transaction should be authorized and sends an authorization response message back to the payment processing network to indicate whether or not the current transaction is authorized. The payment processing system then forwards the authorization response message to the acquirer. The acquirer then sends the response message to the service provider 26, which then sends the response message to the merchant's mobile payment acceptance device 22. The merchant is thus made aware of whether the issuer has authorized the transaction, and hence whether the transaction can be completed.

At a later time, a clearance and settlement process may be conducted by elements of the payment/transaction processing system depicted in FIG. 2. A clearance process involves exchanging financial details between an acquirer and an issuer to facilitate posting a transaction to a consumer's account and reconciling the consumers settlement position. Clearance and settlement can occur simultaneously or as separate processes.

Payment processing network 34 may include a server computer. A server computer is typically a powerful computer or cluster of computers. For example, the server computer can be a large mainframe, a minicomputer cluster, or a group of servers functioning as a unit. In one example, the server computer may be a database server coupled to a web server. Payment processing network 34 may use any suitable combination of wired or wireless networks, including the Internet, to permit communication and data transfer between network elements. Among other functions, payment processing network 34 may be responsible for ensuring that a consumer is authorized to conduct a transaction (via an authentication process), confirm the identity of a party to a transaction (e.g., via receipt of a personal identification number), confirm a sufficient balance or credit line to permit a purchase, or reconcile the amount of a purchase with the consumer's account (via entering a record of the transaction amount, date, etc.).

The payment device 20 may take one of many suitable forms. As mentioned above, the portable payment device can be a mobile device that incorporates a contactless element such as a chip for storing payment information (e.g., a BIN number, account number, etc.) and a near field communications (NFC) data transfer element such as an antenna, a light emitting diode, a laser, etc. The portable payment device may also include a keychain device (such as the Speedpass™ commercially available from Exxon-Mobil Corp.), etc. The device containing the contactless card or chip, or other data storage element may be a cellular (mobile) phone, personal digital assistant (PDA), pager, transponder, or the like. The portable payment device may also incorporate the ability to perform debit functions (e.g., a debit card), credit functions (e.g., a credit card), or stored value functions (e.g., a stored value or prepaid card).

Figure 12:
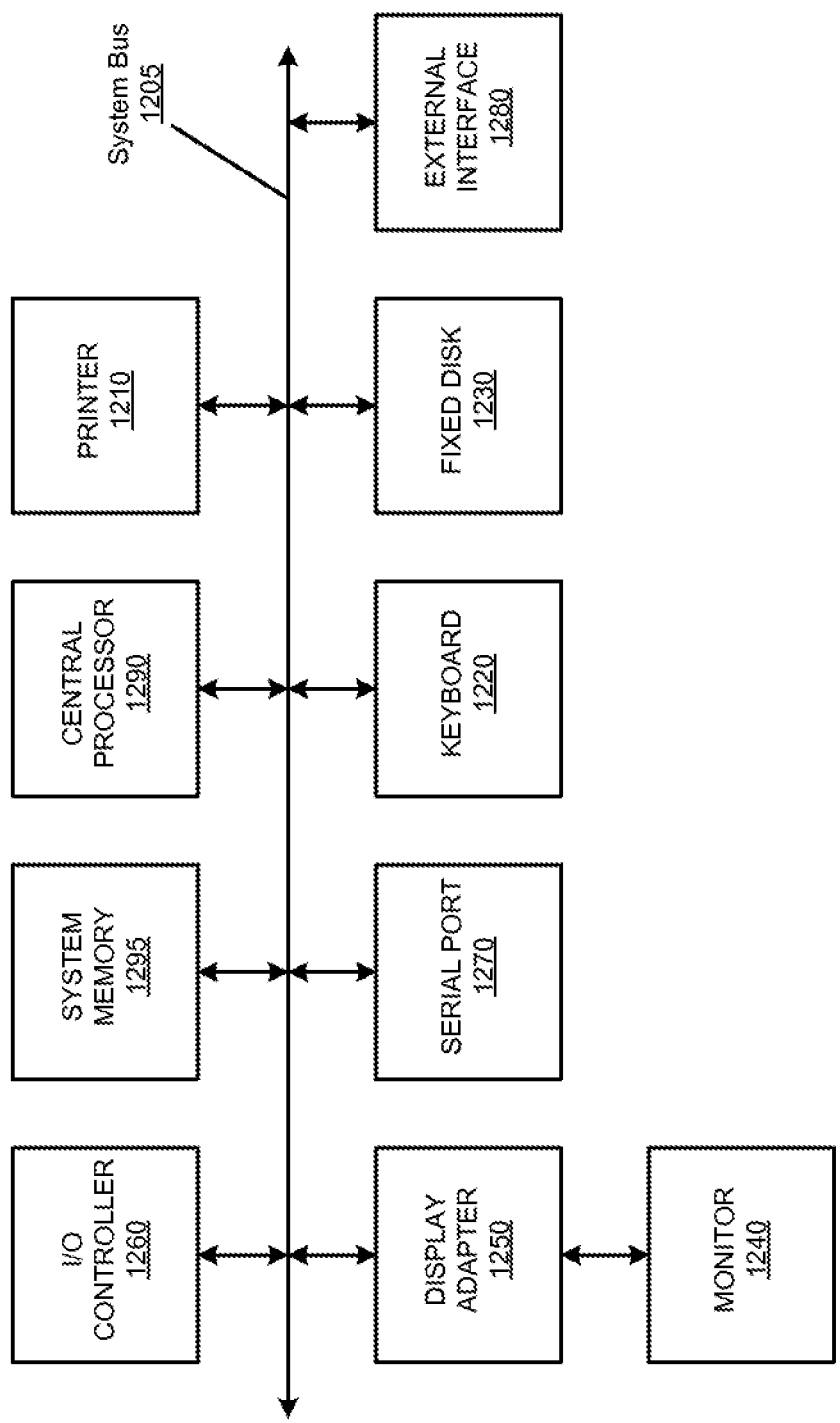
FIG. 12 provides a block diagram of an exemplary computer system in which various embodiments can be implemented.

FIG. 12 shows a block diagram of an exemplary computer apparatus that can be used in some embodiments of the invention (e.g., in any of the components shown in the prior Figures).

The subsystems shown in FIG. 12 are interconnected via a system bus 1205. Additional subsystems such as a printer 1210, keyboard 1220, fixed disk 1230 (or other memory comprising computer readable media), monitor 1240, which is coupled to display adapter 1250, and others are shown. Peripherals and input/output (I/O) devices, which couple to I/O controller 1260, can be connected to the computer system by any number of means known in the art, such as through serial port 1270. For example, serial port 1270 or external interface 1280 can be used to connect the computer apparatus to a wide area network such as the Internet, a mouse input device, or a scanner. The interconnection via system bus 1205 allows the central processor 1290 to communicate with each subsystem and to control the execution of instructions from system memory 1295 or the fixed disk 1230, as well as the exchange of information between subsystems. The system memory 1295 and/or the fixed disk 1230 may embody a computer readable medium.

The previous description of the embodiments is provided to enable any person skilled in the art to practice the invention. The various modifications to these embodiments will be readily apparent to those skilled in the art, and the generic principles defined herein may be applied to other embodiments without the use of inventive faculty. Thus, the present invention is not intended to be limited to the embodiments shown herein, but is to be accorded the widest scope consistent with the principles and novel features disclosed herein. For example, although some specific embodiments describe the use of a message conversion process with typical brick and mortar type merchants, embodiments of the invention can also be used in on-line e-commerce type transactions.

Embodiments of the invention are not limited to the above-described embodiments. For example, although separate functional blocks are shown for an issuer, payment processing system, and acquirer, some entities perform all of these functions and may be included in embodiments of invention.

Further, additional embodiments of the invention may be directed to methods and systems involving merchants, and their access devices, as well as issuers. For example, other embodiments may include the following additional embodiments.

It should be understood that the present invention as described above can be implemented in the form of control logic using computer software in a modular or integrated manner. Based on the disclosure and teachings provided herein, a person of ordinary skill in the art can know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a memory device, such as a random access memory (RAM), a read only memory (ROM), a magnetic medium such as a hard-drive or a floppy disk, or an optical medium such as a CDROM. Any such computer readable medium may reside on or within a single computational apparatus, and may be present on or within different computational apparatuses within a system or network.

One or more features from any embodiment may be combined with one or more features of any other embodiment without departing from the scope of the invention.

A recitation of "a", "an" or "the" is intended to mean "one or more" unless specifically indicated to the contrary. A recitation of "she" is meant to be gender neutral, and may be read as "he" or "she", unless specifically indicated to the contrary.

All patents, patent applications, publications, and descriptions mentioned above are herein incorporated by reference in their entirety for all purposes. None is admitted to be prior art.

What is claimed is:

1. A computer-implemented method, comprising performing by a merchant service computer system:
   obtaining, by a payment service executing on the merchant service computer system, order information for a transaction from a merchant server of a merchant via a post from a user device;
   receiving, by the payment service, a merchant-generated one-way hash of the order information as part of the post from the user device;
   generating, by the payment service, a one-way hash of the order information using the order information;
   comparing, by the payment service, the received merchant-generated one-way hash of the order information to the generated one-way hash of the order information to verify that the order information is authentic;
   upon verifying that the order information is authentic, providing, by the payment service, a hosted order page on behalf of the merchant, wherein the hosted order page is displayed on the user device;
   obtaining, by the payment service via the hosted order page, payment information from the user device on behalf of the merchant;
   transmitting, from the payment service to a transaction service executing on the merchant service computer system, a transmission including both the order information obtained from the merchant server and the payment information obtained from the user device, wherein the transaction service comprises a fraud detection service;

receiving, at the payment service from the transaction service, an approve or deny indication using the payment information and the order information;

if the transaction is denied, displaying, by the payment service, a transaction denied page on the hosted order page; and if the transaction is approved, sending, by the payment service, the transaction along with the payment information to a payment processing server.

2. The computer-implemented method of claim 1 wherein the order information including information about an item in a purchase transaction involving a user and the merchant.

3. The computer-implemented method of claim 1 wherein the post is sent by the user device to the merchant service computer system.

4. The computer-implemented method of claim 1 wherein the order information includes at least one of a purchase amount, a sales tax amount, a shipping address, shipping and handling costs, a billing address, and an email address.

5. The computer-implemented method of claim 1 further comprising:

obtaining order-page configurations designated by the merchant server, wherein the hosted order page is provided in accordance with the order-page configurations.

6. The computer-implemented method of claim 1, wherein the payment information obtained from the user device is transmitted from the payment service to the transaction service by-passing the merchant server.

7. The computer-implemented method of claim 1, further comprising:

determining that the merchant server enabled fraud detection services for the transaction prior to evaluating the payment information and the order information;

transmitting the payment information or the order information to the fraud detection services to run the payment information or the order information through a plurality of fraud detection algorithms to assess a risk associated with the transaction.

8. The computer-implemented method of claim 1, wherein the merchant is not required to comply with requirements of Payment Card Industry (PCI).

9. The computer-implemented method of claim 1, wherein the transmission is transmitted via Secure Sockets Layer (SSL) communication protocol.

10. The computer-implemented method of claim 1, wherein the post from which the order information is obtained is an HTML POST.

11. A system, comprising:

a processor; and a memory device storing instructions for implementing a payment service executing on a merchant service computer system, wherein the instructions, when executed by the processor, cause the processor to:

obtain order information for a transaction from a merchant server of a merchant via a post from a user device;

receive a merchant-generated one-way hash of the order information as part of the post from the user device;

generate a one-way hash of the order information using the order information;

compare the received merchant-generated one-way hash of the order information to the generated one-way hash of the order information to verify that the order information is authentic;

upon verifying that the order information is authentic, provide a hosted order page on behalf of the merchant, wherein the hosted order page is displayed on the user device;

obtain, via the hosted order page from the user device, payment information from the user device on behalf of the merchant;

transmit, to a transaction service executing on the merchant service computer system, a transmission including both the order information obtained from the merchant server and the payment information obtained from the user device, wherein the transaction service comprises a fraud detection service;

receive, from the transaction service, an approve or deny indication using the payment information and the order information;

if the transaction is denied, display a transaction denied page on the hosted order page; and if the transaction is approved, send the transaction along with the payment information to a payment processing server.

12. The system of claim 11, wherein the post from which the order information is obtained is an HTML POST and wherein the payment information is transmitted from the user device to the payment service via Secure Sockets Layer (SSL) communication protocol.

13. The system of claim 11, wherein the order information including at least one of a purchase amount associated with an item in a purchase transaction involving a user and the merchant, a sales tax amount, a shipping address, shipping and handling costs, a billing address, and an email address.

14. The system of claim 11, wherein the instructions, when executed by the processor, further cause the processor to:

if the transaction is denied, request another form of payment from the user device.

15. The system of claim 11, wherein the instructions, when executed by the processor, further cause the processor to:

if the transaction is denied, redirect the hosted order page to a merchant website.

16. The system of claim 11, wherein the payment information obtained from the user device is transmitted from the payment service to the transaction service by-passing the merchant server thereby absolving the merchant server to be Payment Card Industry (PCI)-compliant.

17. The system of claim 11, wherein the instructions, when executed by the processor, further cause the processor to:

provide basic fraud detection services on the transaction.

18. The system of claim 11, wherein the instructions, when executed by the processor, further cause the processor to:

submit the payment information or the order information to the fraud detection service for a fraud detection analysis.

19. The system of claim 18, wherein the fraud detection analysis includes running the payment information or the order information through a plurality of fraud detection algorithms to assess a risk associated with the transaction.

20. The system of claim 18, wherein the instructions, when executed by the processor, further cause the processor to:

receive an accept/deny determination for the transaction from the fraud detection service; and transmit the accept/deny determination to the merchant server.

\* \* \* \* \*